United States Patent [19]
McKeown et al.

[11] Patent Number: 6,130,608
[45] Date of Patent: Oct. 10, 2000

[54] LATERAL ACCELERATION DETECTING DEVICE FOR VEHICLES

[75] Inventors: Stephen Lyle McKeown, 200 Center St., P.O. Box 670, Campbellford, Canada, K0L 1L0; Jon Philip Sheaff, Campbellford, Canada

[73] Assignee: Stephen Lyle McKeown, Campbellford, Canada

[21] Appl. No.: 09/236,329

[22] Filed: Jan. 25, 1999

[51] Int. Cl.[7] .................................................. B60Q 1/00
[52] U.S. Cl. ............................ 340/438; 340/440; 701/38
[58] Field of Search .................................... 340/439, 438, 340/440; 701/38

[56] References Cited

U.S. PATENT DOCUMENTS 5,548,273  8/1996  Nicol et al. .............................. 340/439

Primary Examiner—Daryl Pope
Attorney, Agent, or Firm—Dowell & Dowell PC

[57] ABSTRACT

This invention relates to a device mountable within a vehicle and connectable to a power source to monitor and warn drivers of the lateral g-forces being experienced by the vehicle during use. The device comprises an accelerometer means comprising an accelerometer chip capable of measuring the lateral g-forces between 0 and 1 g-force units experienced by a vehicle upon mounting the device in the vehicle by providing a signal output indicative of the lateral g-force experienced; adjustment means adjustable by the operator of the vehicle for varying the signal output from the accelerometer means; measuring means for measuring the signal output emitted from the adjustment means; and indicator means for indicating to the driver when the mounted vehicle experiences lateral g-forces of a magnitude programmed by the adjustment means.

12 Claims, 5 Drawing Sheets

LATERAL ACCELERATION DETECTING DEVICE FOR VEHICLES

FIELD OF THE INVENTION

This invention relates to a device mountable in a vehicle to monitor the lateral g-forces experienced by the vehicle during use and to provide the driver with a warning if later g-forces experienced by the vehicle approach a pre-determined value.

BACKGROUND OF THE INVENTION

Vehicles can and do tip over due to excessive lateral g-forces with catastrophic destruction and injury often resulting. The risk increases for vehicles, such as transport trucks or utility trucks, having a higher center of gravity and carrying heavier loads, especially during the negotiation of sharp or inclined turns.

There have already been some devices developed for vehicles to provide drivers with warning or to monitor the vehicle during situations when the g-forces experienced by the vehicle are unsafe, but, prior to this invention, those devices have not been readily adopted for practical reasons. Those reasons include difficulty in installation, high cost, and difficulty in making the necessary modifications by way of calibration to the device so that the device is useful to the particular vehicle in which it has been installed.

Despite the longstanding seriousness of the problem of lateral g-forces causing vehicular accidents, there remains no device on the market sufficiently overcoming the noted problems.

It is an object of the present invention to provide a lateral g-force monitoring and warning device that is compact, simple in design, easy to install and easily calibratable after installation.

Other objects and achievements of the invention will become apparent upon threading the complete specification.

BRIEF SUMMARY OF THE INVENTION

According to one aspect of the present invention, there is provided a device mountable within a vehicle and connectable to a power source to monitor and warn drivers of the lateral g-forces being experienced by the vehicle during use. The device comprises an accelerometer means comprising an accelerometer chip capable of measuring the lateral g-forces between 0 and 1 g-force units experienced by a vehicle upon mounting the device in the vehicle by providing a signal output indicative of the lateral g-force experienced; adjustment means adjustable by the operator of the vehicle for varying the signal output from the accelerometer means; measuring means for measuring the signal output emitted from the adjustment means; and indicator means for indicating to the driver when the mounted vehicle experiences lateral g-forces of a magnitude programmed by the adjustment means.

IN THE DRAWINGS

The invention will be more readily understood after reading the following description of the preferred embodiment in conjunction with the drawings in which.

DESCRIPTION OF THE PREFERRED EMBODIMENT

Figure 1:
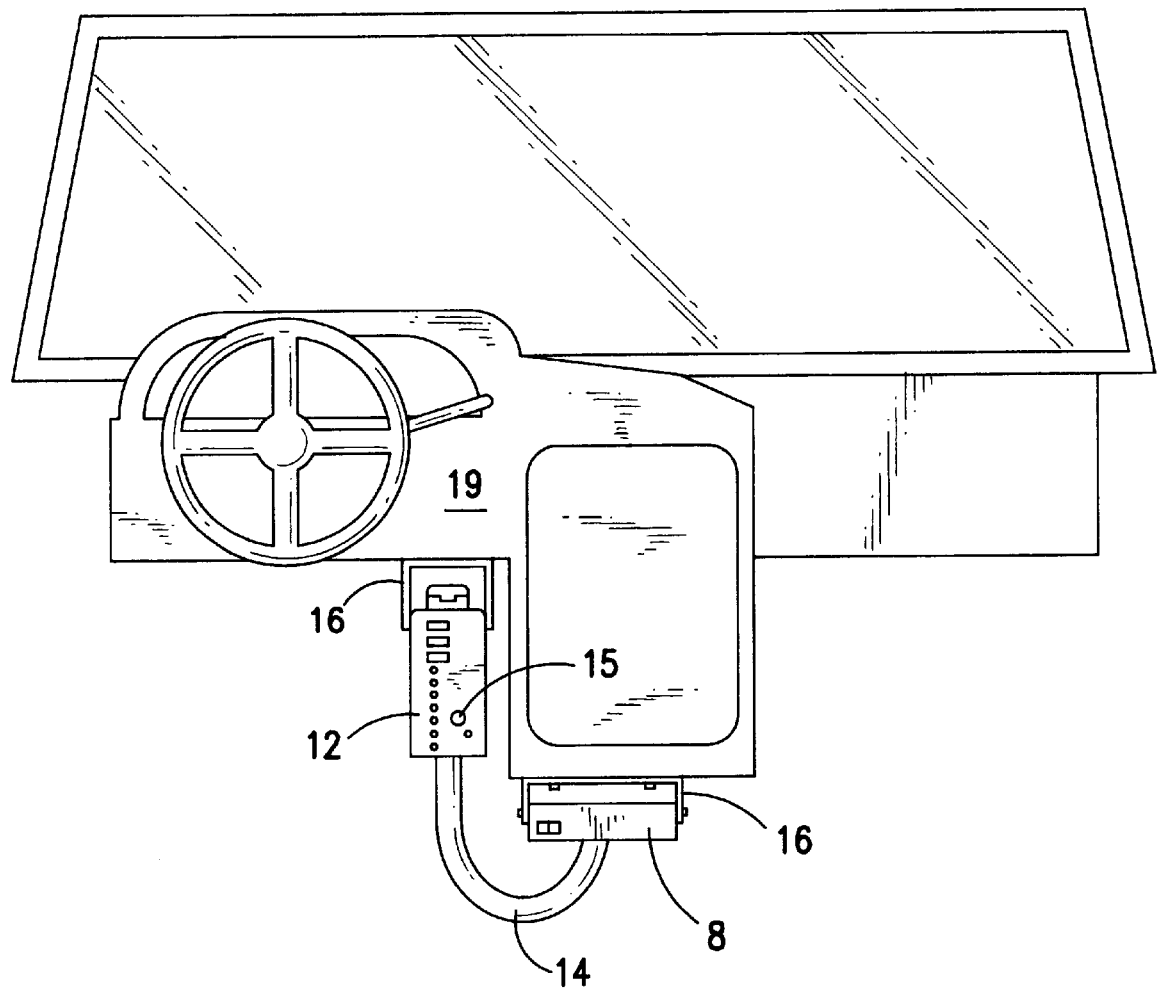
FIG. 1 is a simplified illustration of the front of a truck cab showing the device mounted beneath the dash board.
Figure 2:
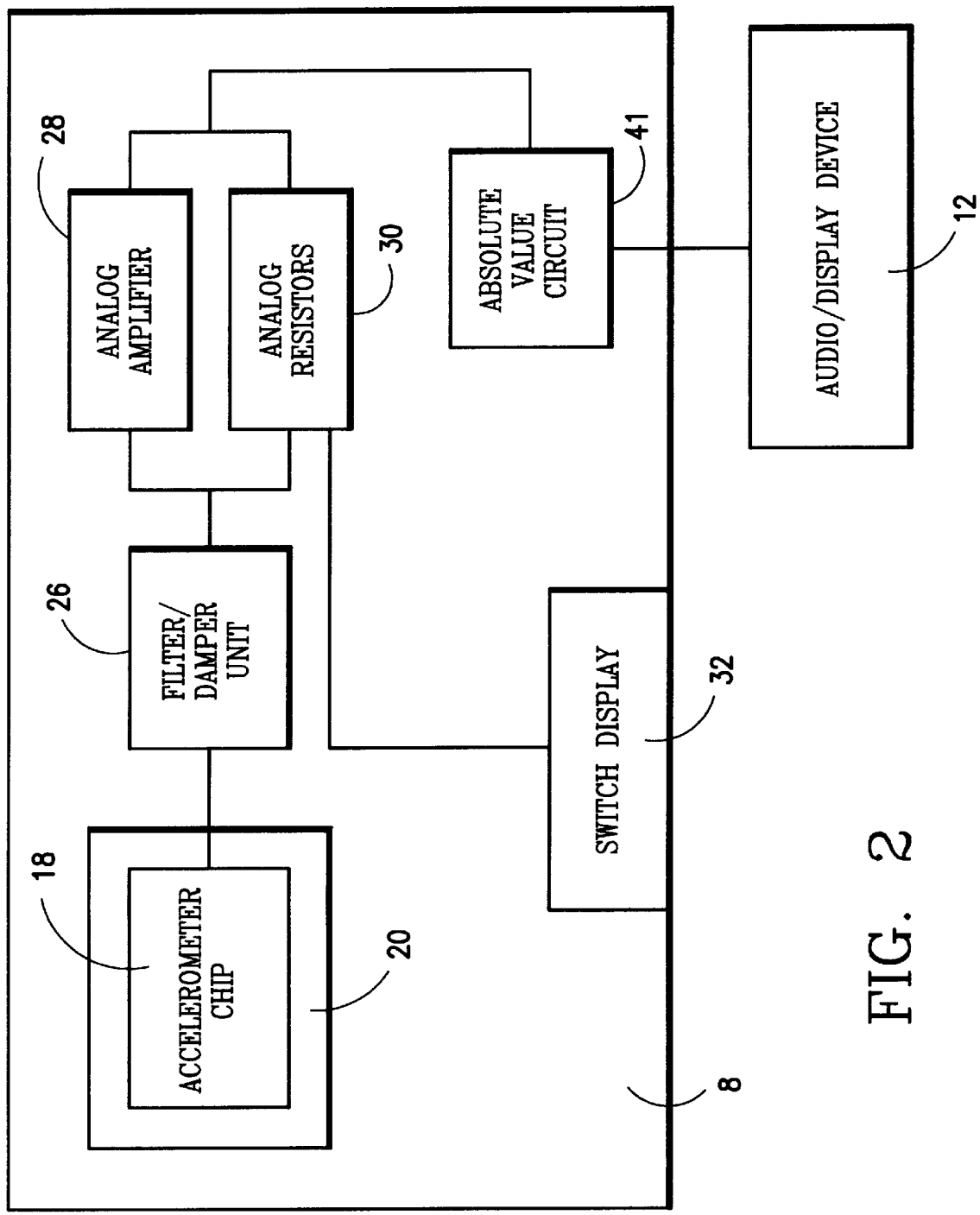
FIG. 2 is a block diagram showing the main components of the device.
Figure 3:
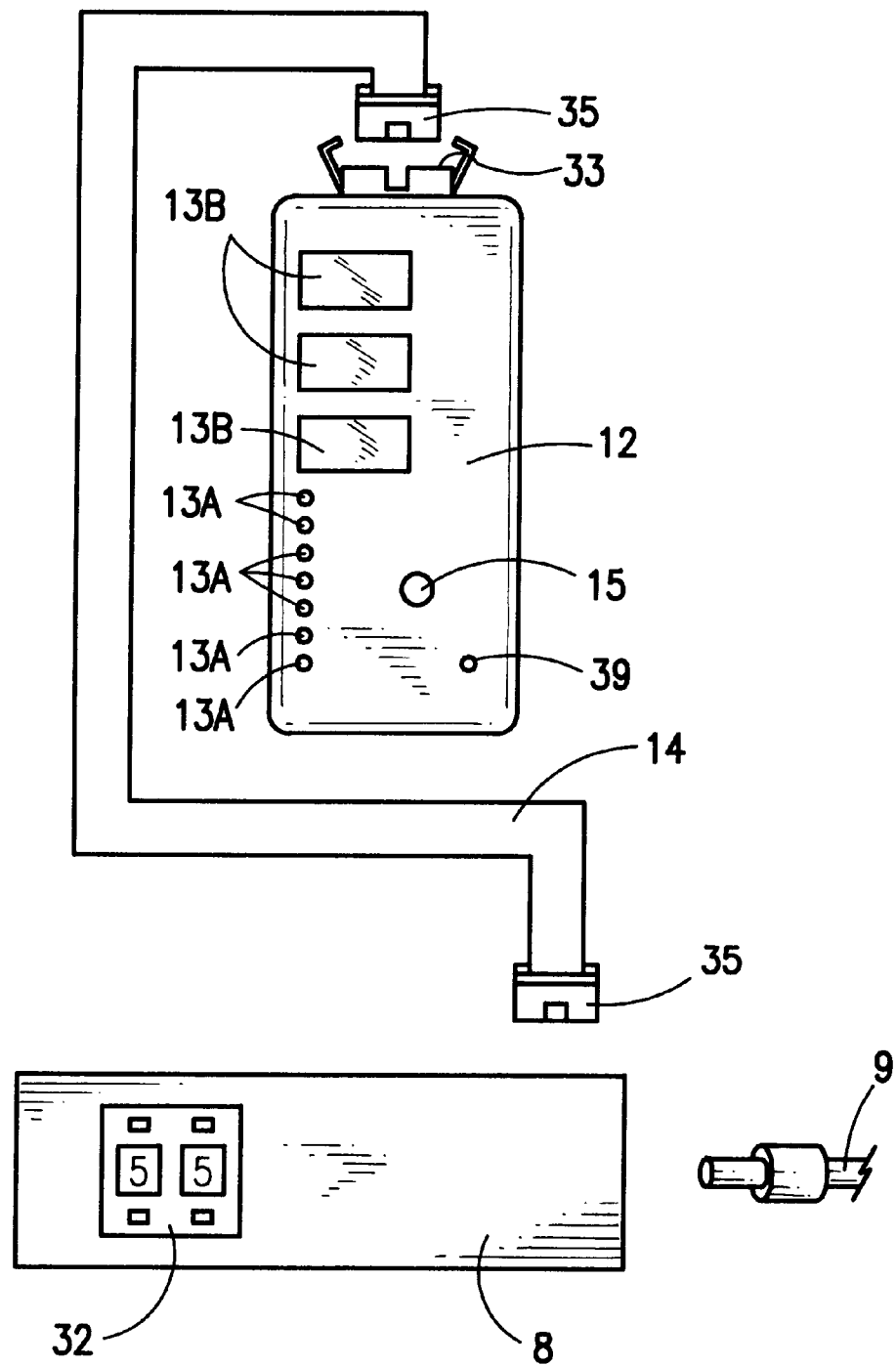
FIG. 3 is a front illustration showing the different components of the device.
Figure 4A:
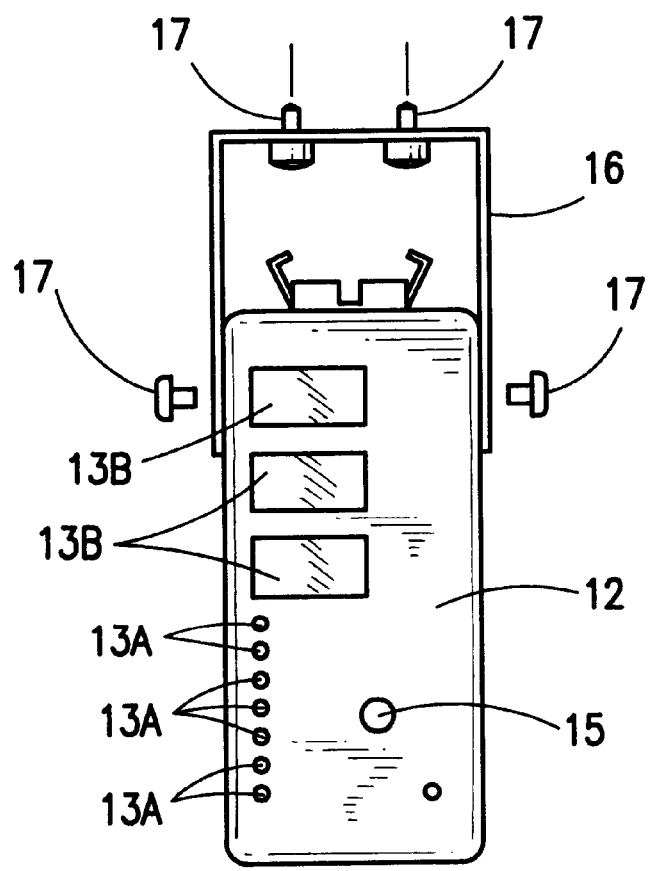
FIG. 4A is front view of the audio/display of the device and mounting means.
Figure 4B:
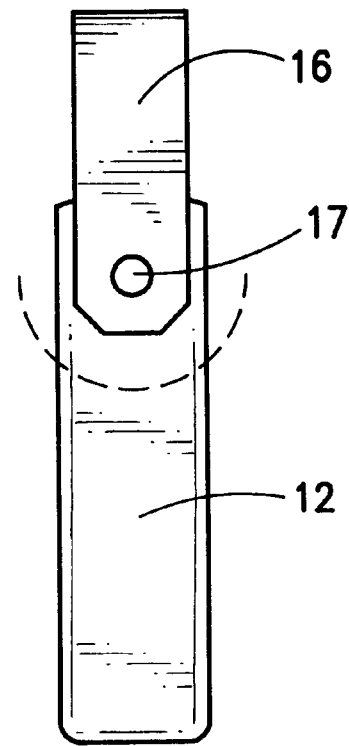
FIG. 4B is a side view of the audio/display of the device and mounting means.
Figure 5A:
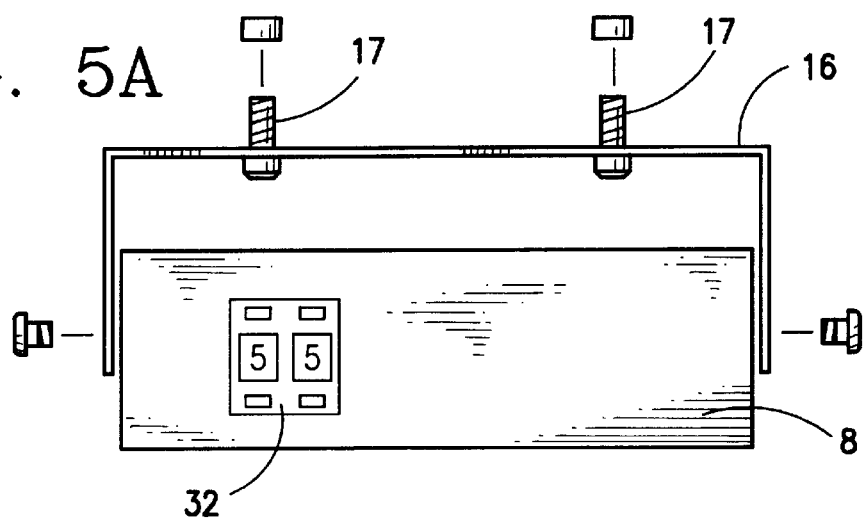
FIG. 5A is a front view of the main unit of the device and mounting means.
Figure 5B:
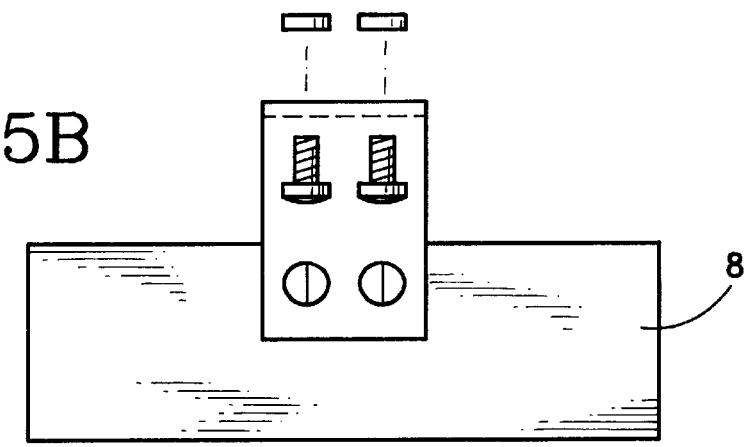
FIG. 5B is a side view of the main unit of the device and mounting means.
Figure 5C:
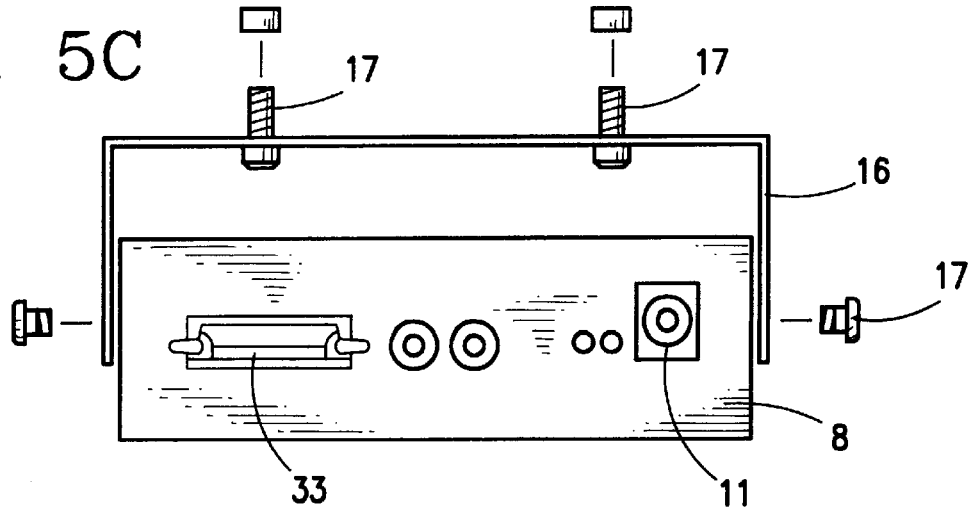
FIG. 5C is a back view of the main unit of the devcie and mounting means.

Referring to the drawings, there is provided a main unit 8 for measuring the acceleration experienced by the unit 8, and when properly mounted within the vehicle as shown in FIG. 1, the lateral acceleration forces of the vehicle.

The main unit 8 is connected to the vehicle power supply in the conventional manner using a 12V connector 9 which plugs into socket 11 at the back of the main unit 8. It is thereby able to draw power for operation.

The purpose of the main unit 8 is measure the lateral acceleration experienced by its component parts and transmit via transmission line 14 a signal proportional thereto to the audio/display unit 12. The audio/display unit 12 then provides an indication of the magnitude of the signal visually using lights 13A and 13B, and, upon surpassing a predetermined arbitrary threshold adjustable by the operator, audibly through speaker 15.

The main unit 8 in the preferred embodiment has a main circuit board with the signal-generating component parts mounted thereon .

Among the parts mounted to the circuit board 15 are the components of the accelerometer means for measuring the lateral forces experienced by the vehicle. By (gauging these forces, an important component in the stability of the vehicle is also gauged because, as explained previously, excessive lateral g-forces can cause the vehicle to tip over.

The accelerometer means includes an accelerometer chip 18 which measures g-force (one g-force unit having a magnitude equivalent to approximately 9.81 m/s$^2$ or, more particularly, the magnitude of the acceleration due to gravity). It is mounted in the unit, which is in turn mountable within the vehicle, so that it measures the force in the lateral directions.

Accelerometer chips have been available for decades and are commonly available in both digital and analog format. In the preferred embodiment, the accelerometer chip 18 used is an analog chip because it has been found by the inventor to reliably measure g-force in a vehicular situations without being materially affected by power surges that can occur in the normal operation of the vehicle. However, the type of chip used, be it analog or digital, is one of personal preference by the designer.

In the preferred embodiment, the inventor has been able to usefully incorporate an analog accelerometer chip which can provide outward transmission of between 0 and 5 volts DC. In particular, the inventor uses an accelerometer chip sold as part no. ADXL05AH as manufactured by Analog Devices. As purchased, the accelerometer chip 18 is biased at about 1.8 volts; however, it is preferable that the bias be altered to 2.5 volts, as will be explained below, so that there is a broader range for the voltage to change in either direction. By altering the bias, a greater scope of lateral acceleration can be measured.

Usage of the present embodiment has shown that in the preferred embodiment that when 1 g force occurs or is experienced by the vehicle in the lateral direction, there is a chance in voltage away from the bias of about 400 millivolts.

As is known, accelerometer chips of the type used in this invention operate most accurately in controlled temperature conditions and, in the present case, the accelerometer chip 18 is encased in a ceramic encasement micro-oven 20. The ceramic encasement micro-oven 20, as used, maintains a temperature environment for the accelerometer chip of between 57 C and 63 C. By using an encasement chip such as the ceramic encasement micro-oven 20, the results generated by the accelerometer chip 18 are standardized and impervious to the diverse environmental conditions of different vehicles.

A ceramic encasement micro-oven found to be effective for the purpose of this invention by the inventor is presently sold as part no. M051260 as made available by Isotemp Research.

The accelerometer chip 18 coupled with the ceramic encasement micro-oven 20 is mounted on the circuit board, which in turn is fixedly mounted within the casing of the main unit 8 so that when the main unit 8 is mounted within the vehicle, as shown in FIG. 1, using standard brackets 16 and screw securement 17, the accelerometer chip 18 experiences material changes in voltage only in those cases where there are material forces being asserted against the vehicle in one of the two lateral directions. As illustrated in FIG. 1, the main unit 8 and the audio/display unit 12 can be easily mounted beneath a conventional dashboard 19 of a vehicle.

Further to generating a simple change of voltage in an accelerometer chip, however, it is critical for a device to be of practical use that the voltage be alterable to be relevant to the vehicle. It is known by operators that vehicles of different sizes, shapes and loads have different thresholds of lateral acceleration at which the operation of the vehicle becomes unsafe. Illustrative of the different safety thresholds is a rollover chart, reproduced below published by Transport Canada relating to vehicles operating on public highways in Canada. The below chart was created after an investigation of the roll stability and handling performance of an Oshkosh T-3000 Truck in April, 1997.

| Vehicle No. | Load Description | Axle Loads, kg | | | | Gross Weight kg | Rollover Threshold g |
|---|---|---|---|---|---|---|---|
| | | front | rear | | | | |
| 1 | gravel | 5,440 | 23,440 | | | 28,440 | 0.46 |
| 2 | gravel | 7,720 | 20,080 | | | 27,800 | 0.50 |
| 3 | gravel | 11,840 | 26,380 | | | 38,220 | 0.45 |
| 4 | gravel at front of box | 14,010 | 20,290 | | | 34,300 | 0.45 |
| 4b | gravel | 11,880 | 22,430 | | | 34,310 | 0.48 |
| 5 | wet gravel | 7,550 | 19,180 | | | 26,730 | 0.40 |
| 6 | dry crushed stone | 7,490 | 18,080 | | | 25,570 | 0.40 |
| 7a | wet stone load level | 15,320 | 17,400 | | | 32,720 | 0.32 |
| 7b | wet stone load rotated to low side of tilt table | 15,340 | 17,380 | | | 32,720 | 0.30 |
| 7c | wet stone, | 17,550 front | 15,230 middle | rear | | 32,780 | 0.35 |
| 8a | empty | 4,820 | 5,040 | 4,200 | | 14,060 | 0.68 |
| 8b | 24 rolls of paper | 5,260 | 14,500 | 14,340 | | 34,100 | 0.34 |
| 9a | mail in stacked containers | 3,850 front | 12,040 middle | 11,100 middle | rear | 27,010 | 0.39 |
| 10 | gasoline | 4,890 | 17,200 | 22,000 | 17,400 | 61,990 | 0.33 |

As indicated above, factors such as size of the vehicle, shape of the vehicle, size of the load of the vehicle all affect the level of lateral g-force at which driving the vehicle becomes unsafe. Furthermore, these are factors which can change daily. Each new load may mean a different critical lateral g-force. Therefore, the operator should be able to modify the g-force sensitivity if the device is to generate useful information.

The present invention provides such an adjustment means easily adjustable by the operator to reflect changes in load or other factors. In the preferred embodiment, the adjustment means used to modify the voltage generated from the accelerometer chip to be meaningful comprises firstly a filter/damper unit 26 for biasing the voltage of the accelerometer to 2.5 volts and dampening the effect of high frequency or vibration interference,, analog amplifiers (op amps) 28 for amplifying the change in voltage generated by the accelerometer about the 2.5 volt biased measurement and analog resistors 30 mounted in parallel circuit arrangement with the analog amplifiers. The analog resisters 30 are two-position adjustable and are connected in the conventional manner to switch/display 32. Switch/display 32 permits entry of digits between 00 and 99 so that the resistance of the analog resistors 30 can be varied in increments of 1/100 from 0 to full value. In the present case, the amplifier used is a LM2904op amp, which amplifies the change in voltage by up to 12×. Unlike the resistors, the op amps are not variable by adjustment. However, because the op amps are in parallel circuit arrangement with the resistors, by modifying the resistance, the change in voltage emanating from the accelerometer chip can be increased or decreased. The resistance is increased by increasing the value appearing on the switch/display 32 and the resistance is decreased by decreasing the value appearing on the switch/display 32, 34. Because of the parallel circuitry relationship between the op amps and the resistors, when the resistance is increased any value generated by the accelerometer will be magnified and when the resistance is decreased any value generated by the accelerometer will be decreased.

In short, for the operator to increase sensitivity of the unit so that a stronger signal is emitted at a lower lateral g-force, the numbers on the switch/display 32 are increased.

The circuitry arrangement of the resistors and op amps are not described in detail because they are of standard arrangement (apart from the invention as a whole). Resistors and op amps of the type useable here are available under numerous brand names and specification as required by the designer.

It will also be appreciated that if the parallel arrangement of the resistors and the opt amps was to be reversed, the change in voltage would be magnified by a decrease in the numberings on the display keys 32 and decreased by an increase the numbering on the display keys 32. Whether to increase or decrease the sensitivity upon increasing the numbers of the switch/display 32 is an issue of design preference only.

After the change in voltage has been magnified or increased by the amplifier-resistor arrangement, the change is voltage is converted to a positive value by passing the voltage signal through an absolute value circuit 41.

In result, by virtue of the adjustment means, a positive voltage signal proportional to the lateral forces experienced by the vehicle and adjustable by the operator can be generated and transmitted to the audio/display device 12.

The audio/display unit of standard specification which, in the preferred embodiment, includes ten lights, numbered 13A for the smaller lights and numbered 13B for the larger lights which light up at the more critical g-forces. The lights 13A and 13B light up sequentially moving from the bottom light to the top light depending upon the magnitude of the voltage signal received from the main unit via the transmission line 14 (which, as illustrated uses a standard pin plug 35 and socket 33 for securement. In the embodiment provided, the display/audio device is designed to completely light up (i.e. all ten lights) upon receiving a signal of 4.9 volts or higher. The display/audio unit also includes a speaker means that is designed to provide an audio signal of increasing volume as the lights light up increasingly from the eighth to tenth light, namely lights 13B.

The audio/signal device is of standard specification and can be purchased off of the shelf and is easily modifiable by the designer. In the present case, the audio/signal device used is a Peizo Buzzer manufactured by Projects Unlimited. The voltage range for the lights is modified by internal resistors so that each successive light is powered upon a particular voltage signal being emitted. The sound aspect of the audio/signal device is triggered by the same circuitry as the lights. In the preferred embodiment, a minimal sound signal is emitted concurrently when the eight light is powered on, a louder sound signal is emitted through speaker 15 concurrently when the ninth light is powered on and the loudest sound signal is emitted concurrently when the tenth light is powered on.

In use, the main device is carefully and securely mounted in the vehicle so that the bottom wall of the casing is substantially parallel to the floor of the vehicle. Upon being powered by line 9, a power indicator light 39 lights up. The audio/display device, wire-connected to the main unit, is mounted where it is visible to the driver so that the lighting up of any of the lights 13A, 13B can be observed and the audio signal, if generated can be heard. As illustrated in the drawings, one suitable place of mounting is above the dashboard beside the driver. After the device has been mounted, the operator can modify its sensitivity as described above by changing the setting on the switch/display 32 to increase or decrease the sensitivity of the device. Upon starting the ignition, the device should be operational within twenty seconds (the time required for the encasement ovens to heat up and provide the proper temperature for the accelerometer chip to function).

This invention provides a reliable means for indicating to the driver lateral forces experience by the vehicle and a means of easily adjusting the sensitivity of the indicator means so that a meaningful indication of the effect of those lateral g-forces can be provided to the operator.

It will be understood that the embodiment described is a preferred embodiment only and that variations are possible without deviating from the scope of the invention. The scope of the invention is as claimed in the appended claims.

We claim:

1. A device mountable within a vehicle and connectable to a power source to monitor and warn drivers of the lateral g-forces being experienced by the vehicle during use, comprising:

an accelerometer means comprising an analog accelerometer chip capable of measuring the lateral g-forces between 0 and 1 g-force units experienced by a vehicle upon mounting the device in the vehicle by providing a signal output in analog format indicative of the lateral g-force experienced;

adjustment means adjustable by the operator of the vehicle for varying the signal output from the accelerometer means;

measuring means for measuring the signal output emitted from the adjustment means;

indicator means for indicating to the driver when the mounted vehicle experiences lateral g-forces of a magnitude programmed by the adjustment means.

2. A device mountable within a vehicle and connectable to a power source to monitor and warn drivers of the lateral g-forces being experienced by the vehicle during use, as claimed in claim 1 wherein:

the signal provided by said accelerometer means is a voltage output proportional to the lateral g-force experienced;

and said adjustment means is adjustable as aforeclaimed by the operator of the vehicle to vary the voltage output from the accelerometer means with said measuring means being capable of measuring the voltage emitted from the adjustment means.

3. A device mountable within a vehicle and connectable to a power source to monitor and warn drivers of the lateral g-forces being experienced by the vehicle during use as claimed in claim 1 wherein:

the adjustment means comprises amplification means for amplifying the voltage emitted from the accelerometer means before it is transmitted to the measuring means.

4. A device mountable within a vehicle and connectable to a power source to monitor and warn drivers of the lateral g-forces being experienced by the vehicle during use as claimed in claim 2 wherein:

the adjustment means comprises amplification means for amplifying the voltage emitted from the accelerometer means before it is transmitted to the measuring means.

5. A device mountable within a vehicle and connectable to a power source to monitor and warn drivers of the lateral g-forces being experienced by the vehicle during use as claimed in claim 2 wherein:

the adjustment means comprises resistance means for reducing the voltage being emitted by the adjustment means, wherein the resistance can be increased and decreased to adjust the sensitivity of the signalling means to the lateral g-forces experienced by the vehicle.

6. A device mountable within a vehicle and connectable to a power source to monitor and warn drivers of the lateral g-forces being experienced by the vehicle during use as claimed in claim 3 wherein: the resistance means comprises resistors.

7. A device mountable within a vehicle and connectable to a power source to monitor and warn drivers of the lateral g-forces being experienced by the vehicle during use as claimed in claim 4 wherein: the resistance means comprises resistors.

8. A device mountable within a vehicle and connectable to a power source to monitor and warn drivers of the lateral g-forces being experienced by the vehicle during use as claimed in claim 5 wherein: the resistance means comprises resistors.

9. A device mountable within a vehicle and connectable to a power source to monitor and warn drivers of the lateral g-forces being experienced by the vehicle during use as claimed in claim 1 wherein the indicating means comprises audio means emitting an audio warning signal in response to lateral g-force experienced by the device.

10. A device mountable within a vehicle and connectable to a power source to monitor and warn drivers of the lateral g-forces being experienced by the vehicle during use as claimed in claim 2 wherein the indicating means comprises audio means emitting an audio warning signal in response to lateral g-force experienced by the device.

11. A device mountable within a vehicle and connectable to a power source to monitor and warn drivers of the lateral g-forces being experienced by the vehicle during use as claimed in claim 2 wherein the indicating means comprises audio means emitting an audio warning signal in response to lateral g-force experienced by the device.

12. A device mountable within a vehicle and connectable to a source to monitor and warn drivers of a lateral G-force being experienced by the vehicle during use, as claimed in claim 1, wherein the accelerometer means measures in analogue format.

\* \* \* \* \*

(12) REEXAMINATION CERTIFICATE (4554th)
United States Patent
McKeown et al.

(10) Number: US 6,130,608 C1
(45) Certificate Issued: Apr. 9, 2002

(54) LATERAL ACCELERATION DETECTING DEVICE FOR VEHICLES

(75) Inventors: Stephen Lyle McKeown, 200 Center St., P.O. Box 670, Campbellford (CA), K0L 1L0; Jon Philip Sheaff, Campbellford (CA)

(73) Assignee: Stephen Lyle McKeown, Campbellford (CA)

Reexamination Request:
No. 90/006,014, May 21, 2001

Reexamination Certificate for:
Patent No.: 6,130,608
Issued: Oct. 10, 2000
Appl. No.: 09/236,329
Filed: Jan. 25, 1999

(51) Int. Cl.[7] .................................................. B60Q 1/00
(52) U.S. Cl. .......................... 340/438; 340/440; 701/38
(58) Field of Search .................................. 340/438, 439, 340/440; 701/38

(56) References Cited

U.S. PATENT DOCUMENTS

| | | | |
|---|---|---|---|
| 3,798,594 A | 3/1974 | Funk | 340/440 |
| 4,101,869 A | 7/1978 | Henderson | 340/439 |
| 4,284,987 A | 8/1981 | Gibson et al. | 340/689 |
| 4,528,547 A | 7/1985 | Rodney | 340/439 |
| 4,684,928 A | 8/1987 | Takahashi | 340/521 |
| 5,032,821 A | 7/1991 | Domanico et al. | 340/440 |
| 5,503,016 A | 4/1996 | Koen | 73/493 |
| 5,719,554 A | 2/1998 | Gagnon | 340/439 |

OTHER PUBLICATIONS

Crossbow Technology, Inc., Application Note: Using CXLM Series Analog Accelerometers for Tilt Measurements, May 1998.

M&S Automotive Industries, Motion Dyno: How It Works, May 1998.

*Primary Examiner*—Jeff Hofsass

(57) ABSTRACT

This invention relates to a device mountable within a vehicle and connectable to a power source to monitor and warn drivers of the lateral g-forces being experienced by the vehicle during use. The device comprises an accelerometer means comprising an accelerometer chip capable of measuring the lateral g-forces between 0 and 1 g-force units experienced by a vehicle upon mounting the device in the vehicle by providing a signal output indicative of the lateral g-force experienced; adjustment means adjustable by the operator of the vehicle for varying the signal output from the accelerometer means; measuring means for measuring the signal output emitted from the adjustment means; and indicator means for indicating to the driver when the mounted vehicle experiences lateral g-forces of a magnitude programmed by the adjustment means.

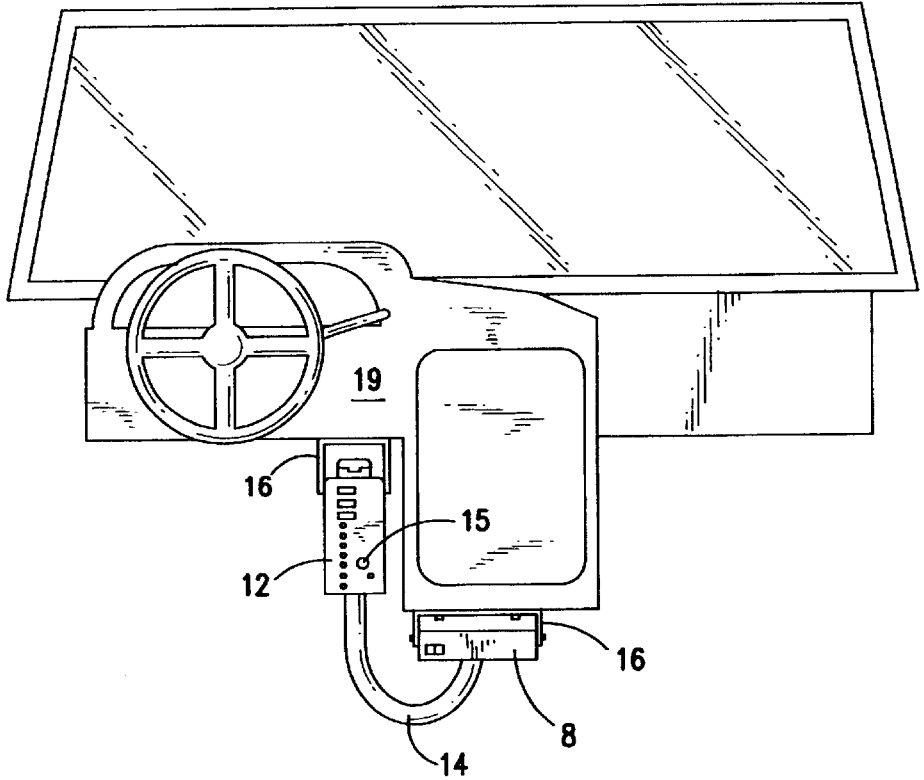

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

\* \* \* \* \*